Patented Feb. 14, 1933

1,897,892

UNITED STATES PATENT OFFICE

FRITZ DRAISBACH, OF LUDWIGSHAFEN-ON-THE-RHINE, GERMANY, ASSIGNOR TO CHEMISCHE FABRIK JOH. A. BENCKISER G. M. B. H., OF LUDWIGSHAFEN-ON-THE-RHINE, GERMANY

METHOD OF PRODUCING CRUSTLESS CHEESE

No Drawing. Application filed July 29, 1931, Serial No. 553,890, and in Germany September 25, 1930.

It has long been known to prepare crustless cheese, by intimately mixing finely ground hard or soft cheese with an aqueous salt solution and heating the whole with or without vacuum to temperatures of 60–75° C. when the melting process has been properly carried out, a completely homogeneous, flowing mass is obtained, which solidifies when cold to a solid cheese paste, which can be easily cut.

The type of salt used for melting is of decisive influence for the success of this melting. Hitherto use has preferably been made of neutral sodium or potassium salts of citric acid and tartaric acid. For this purpose the citric or tartaric acid was dissolved in a nickel vessel and then neutralized with soda or bicarbonate. This neutralization is however inconvenient and may easily cause losses, if care is not taken, owing to frothing over; in addition, these salts are very expensive and thus burden the product more than is in the general interests of a cheap food.

It has also been found that the primary, secondary and also the tertiary sodium salt of ortho-phosphoric acid, possess good properties assisting the fusion. But of these three salts the primary and the tertiary may be disregarded from the outset, since they give the prepared cheese an acid taste or a taste very reminiscent of alkaline lye. The neutral di-sodium-phosphate does not fuse all types of cheese equally well and also gives the finished product a strange, salty after-taste. In order to avoid this drawback, attempts have also been made, to use di-sodium-phosphate mixed with salts of citric acid or tartaric acid, as fusion medium. However this salt mixture suffers at the outset under the disadvantage of the high price of the salts of organic acids.

It has been found that sodium meta-phosphate is an excellent fusion salt, which easily and satisfactorily fuses all types of cheese, has a sufficiently high water binding capacity, is itself perfectly tasteless and also imparts no taste of extraneous nature to the molten cheese. Its particular economic advantage lies however chiefly in its great cheapness as compared with the salts of organic acids, which have hitherto been used.

A further unexpected and valuable property of sodium meta-phosphate is its uniformly good fusion action, irrespective of the age and fat content of the initial cheese to be used. This also enables its use as fusion agent for soft cheese, for which hitherto phosphates could only be used with great difficulty and in the rarest cases. For certain types of cheese, more especially when it is a question of a soft, spreadable finished product, it has been found, that meta-phosphate can be more satisfactorily used mixed with salts of pyro- or ortho-phosphoric acid. As pointed out in the foregoing, it has already been proposed to fuse with di-sodium phosphate, but the crustless cheese made thereby had a salty, unpleasant after-taste. It has also been found that ortho-phosphates as well as pyro-phosphates together with meta-phosphate can be used advantageously as fusion agents only when care is taken that the mixture of sodium meta-phosphate with ortho-phosphate or pyro-phosphate or the mixture of both shall have a hydrogen ion concentration in aqueous solution, which is within the narrow limit of pH=6, 5–7, 5.

This favourable hydrogen ion concentration of the ortho-phosphates or pyro-phosphates is established for example by mixing mono- and di-sodium phosphate or acid and neutral pyro-phosphate in suitable ratios. A favourable mixing ratio is for instance 7 parts of neutral pyro-phosphate and 3 parts of acid pyro-phosphate or 7 parts of neutral pyro-phosphate and 3 parts of mono-sodium phosphate or 7,5 parts of anhydrous di-sodium phosphate and 2,5 parts of mono-sodium phosphate. The surprising observation was made, that these mixtures, which have these favourable hydrogen ion concentrations, mixed with sodium-meta-phosphate, contribute towards the production of an excellent crustless cheese, which fully and perfectly retains the taste of the initial material and causes no different or salty flavour.

In place of the salts of ortho-phosphoric acid, use may also be made of mixtures of sodium meta-phosphate with salts of organic acids, which can be used for edible purposes, such as tartaric acid, citric acid. These mixtures also have good fusion properties.

Crustless cheese according to the present invention is prepared for instance, by treating 100 kgs. finely milled hard cheese with 3 kgs. sodium-meta-phosphate, dissolved in 10 litres of water, and well kneading the whole with or without using vacuum at about 65° C. for 12–15 minutes. The amount of fusion salt given in this example may naturally be varied according to the requirements of the raw material and the demands made of the finished product as regards consistency. In place of meta-phosphate alone, use may also be made of a mixture of for instance 70% meta-phosphate and 30% of an ortho-phosphate or pyro-phosphate or a mixture of both with a hydrogen ion concentration of pH=6,5–7,5.

In this respect too the figures given are not intended to give any fixed limit to the invention.

What I claim is:

1. A method of making crustless cheese from hard or soft cheese consisting in finely grinding the hard or soft cheese, adding a fusion salt comprised of sodium metaphosphate to the ground cheese, and melting the resulting mixture at temperatures below 100° C.

2. A method of making crustless cheese from hard or soft cheese consisting in finely grinding the hard or soft cheese, adding a fusion salt comprised of sodium metaphosphate to the ground cheese, and melting the resulting mixture under vacuum at temperatures below 100° C.

3. A method of making crustless cheese from hard or soft cheese consisting in finely grinding the hard or soft cheese, adding to the ground cheese a fusion salt comprised of sodium metaphosphate and alkali metal pyrophosphate having a hydrogen ion concentration lying within the range pH 6.5–7.5, and melting the resulting mixture at temperatures below 100° C.

4. A method of making crustless cheese from hard or soft cheese consisting in finely grinding the hard or soft cheese, adding to the ground cheese a fusion salt comprised of sodium metaphosphate, alkali metal pyrophosphate and alkali metal ortho-phosphate having a hydrogen ion concentration lying within the range pH 6.5–7.5, and melting the resulting mixture at temperatures below 100° C.

5. A method of making crustless cheese from hard or soft cheese consisting in finely grinding the hard or soft cheese, adding to the ground cheese a fusion salt containing sodium metaphosphate having a hydrogen ion concentration lying within the range pH 6.5–7.5, and melting the resulting mixture at temperatures below 100° C.

6. A method of making crustless cheese from hard or soft cheese consisting in finely grinding the hard or soft cheese, adding a fusion salt comprised of sodium metaphosphate and neutral salts of citric acid to the ground cheese, and melting the resulting mixture at temperatures below 100° C.

7. A method of making crustless cheese from hard or soft cheese consisting in finely grinding the hard or soft cheese, adding to the ground cheese a fusion salt comprised of sodium metaphosphate and alkali metal orthophosphate having a hydrogen ion concentration lying within the range pH 6.5–7.5, and melting the resulting mixture at temperatures below 100° C.

In testimony whereof I have signed my name to this specification.

FRITZ DRAISBACH.